Aug. 3, 1937.  H. HARNISCH  2,089,120
GRAIN BINDER ATTACHMENT
Filed Dec. 22, 1936  2 Sheets-Sheet 1
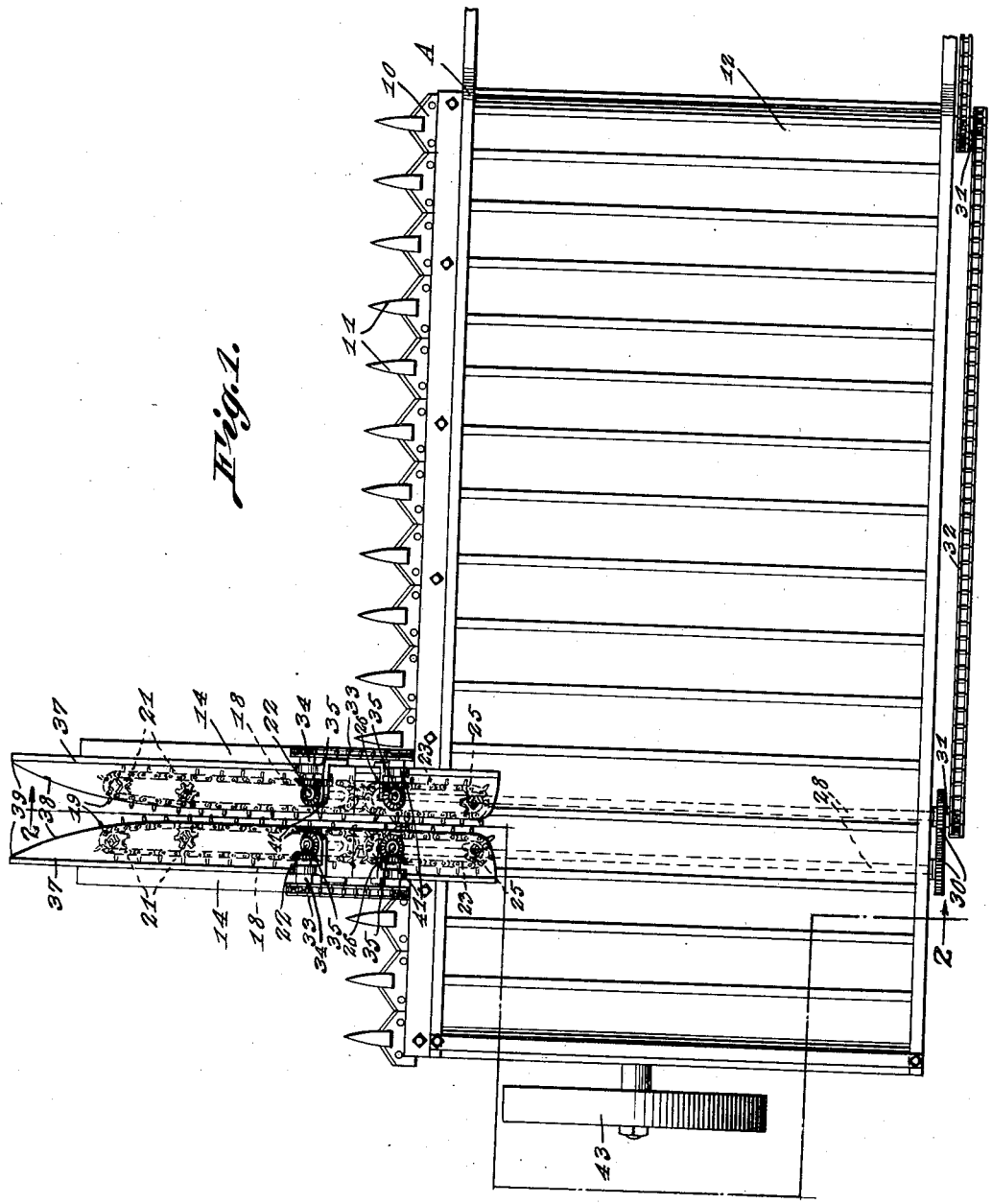
Henry Harnisch, INVENTOR
BY Victor J. Evans & Co.
ATTORNEYS Aug. 3, 1937.   H. HARNISCH   2,089,120
GRAIN BINDER ATTACHMENT
Filed Dec. 22, 1936   2 Sheets-Sheet 2
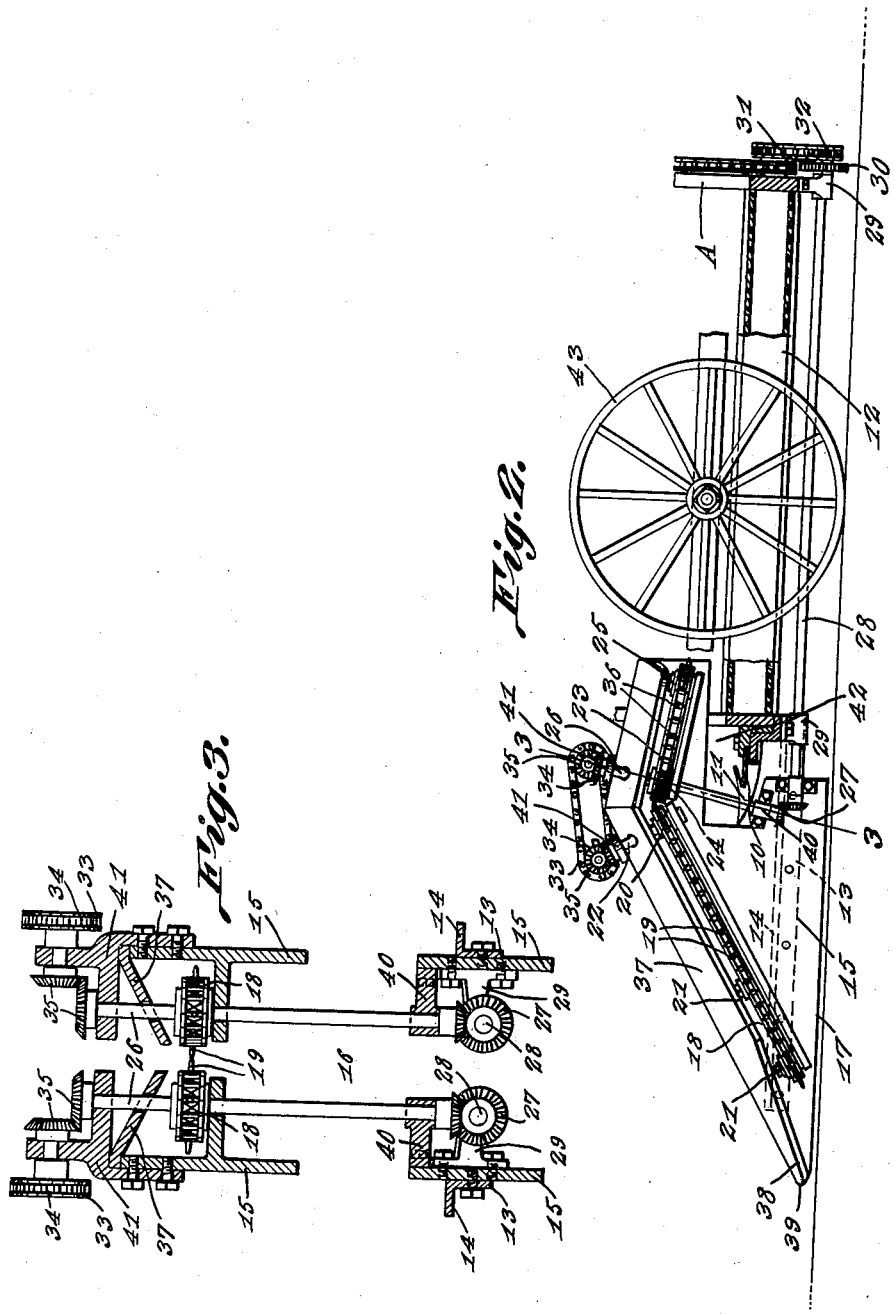
Henry Harnisch, INVENTOR
BY Victor J. Evans & Co.
ATTORNEYS Patented Aug. 3, 1937

2,089,120

UNITED STATES PATENT OFFICE 2,089,120

GRAIN BINDER ATTACHMENT

Henry Harnisch, Ionia, Iowa

Application December 22, 1936, Serial No. 117,218

3 Claims. (Cl. 56—312)

The invention relates to a grain binder attachment and more especially to soy bean harvesting attachments for binders.

The primary object of the invention is the provision of an attachment of this character, wherein the same when applied to the platform of a grain binder the latter can be used for the gathering of soy beans and the cutting of the same while in the field so that the binder may be utilized for binding purposes similarly to its use when grain harvesting.

Another object of the invention is the provision of an attachment of this character, wherein the construction thereof is novel so that it can be readily and easily applied to a grain binder for the converting of the latter into a bean harvester, the attachment being susceptible of fastening to any size of grain binder for bean harvesting operation thereof.

A further object of the invention is the provision of an attachment of this character, which is simple in its construction, thoroughly reliable and effective in operation, readily and easily attached to and removed from a grain binder, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of the attachment constructed in accordance with the invention applied to the platform of a grain binder.

Figure 2 is a vertical transverse sectional view on the line 2—2 of Figure 1.

Figure 3 is a sectional view on the line 3—3 of Figure 2.

Similar reference characters indicate corresponding parts throughout the several views in the drawings.

Referring to the drawings in detail, A designates generally the platform of a grain binder of conventional form equipped at the lead edge thereof with a sickle and guard 10 and 11, respectively, while upon the platform rearwardly of the said sickle and its guard and operating parallel therewith is an endless conveyor or apron 12 which is an adjunct of the grain binder in the feed of the cut material delivered upon this apron or conveyor and to this platform is applied the attachment constituting the present invention and hereinafter fully described.

The attachment comprises a pair of angle bars 13, these being suitably fastened to the under side of the platform A for disposition in spaced parallel relation to each other and projecting forwardly of the sickle 10 properly spaced from one end of said platform. The angle bars are preferably of L-form in cross section and are inverted with the laterally flanged edges 14 thereof outermost from between said bars. Secured to these bars 13 are forwardly tapered substantially triangular shaped side panels or plates 15 forming a way 16 therebetween, the lower edges 17 of these panels or plates 15 are disposed in cross relation to the ground surface.

Carried at the inner faces of the panels or plates 15 are forwardly inclined endless gathering chains 18 having provided on selected links thereof gathering spurs 19. The chains 18 are trained over power and guide sprockets 20 and 21, respectively. The drive sprockets 20 are fixed to stud shafts 22, these being suitably journaled and carried by said panels or plates 15.

In rear of the chains 18 upon the panels or plates 15 in juxtaposition to the high inner ends thereof are reversely inclined endless transfer chains 23 trained over power and guide sprockets 24 and 25, respectively, suitably journaled and supported from the panels or plates 15. The power sprockets 24 are fixed to shafts 26 which are suitably journaled and through meshing pinions or gears 27 are connected with operating shafts 28, these being journaled in bearings 29 fixed to the under side of the frame A and extend in close parallel relation to each other fore and aft of said frame. These shafts 28 at the aft ends thereof carry meshing gears 30 so that said shafts will rotate in unison and in reverse directions to each other while one of the shafts 28 through chain and sprocket connections 31 and 32, respectively, is driven directly from the binder mechanism (not shown).

The shafts 22 and 26 through chains 33, sprockets 34 and gears 35, respectively, are connected with each other for the proper driving of the gathering and transfer chains 18 and 23, respectively. The chains 23 at certain links thereof are provided with spurs 36 to assure the transfer of material onto the apron or conveyor 12 when such material, such as soy beans, have been cut after being gathered in a field by the chains 18 in the way 16 between the panels or plates 15, the cutting of the material being had by the sickle 10 while in operation.

The way 16 between the panels or plates 15 affords a throat for the material and directs the latter to the sickle 10 on advancement of the binder through a field.

The chains 18 at their lowermost ends are in close proximity to the lower edges 17 of the panels or plates 15 and are rearwardly of the smaller forward ends of said panels or plates so that the growing soy beans can be gathered into the throat to be in the path of the sickle 10 for the severing of the beans and the transfer of such severed material onto the apron or conveyor 12.

Directly over the chains 18 and 23 and carried by the panels or plates 15 are inwardly inclined shed or guard planks 37, these being coextensive with the upper edges of said panels or plates and have the forward rounded ends 38 affording a relatively wide entrance at the tips 39 of said panels or plates 15 to the way 16 therebetween to increase the gathering area at the point of the said tips 39 of the attachment. The planks 37 avoid entanglement of the beans or material gathered by the chains 18 and transferred by the chains 23 onto the apron or conveyor 12 during the working of the attachment to the binder.

Suitable bearings 40 and 41, respectively, are provided for the mountings of the shafting and gearing of the attachment and these bearings are carried by the panels or plates 15 as will be clearly apparent from Figures 2 and 3 of the drawings.

The bars 13 are separately fastened to the frame A and likewise the bearings 29 are detachable therefrom so that the attachment can be conveniently removed from the binder when it is desired that the latter be utilized as a grain binder.

The rear ends of the panels or plates 15 are cut into at 42 to form a clearance for the sickle 10 and to have the transfer chains 23 overlap for the required distance the said apron or conveyor 12 for the transfer of the cut material thereonto.

The planks 37 are separated throughout their extent to effect a lead slot centrally of the way 16 for the gathered material when being directed by the chains 18 and the transfer of the severed material when cut by the sickle 10 of the binder onto the apron or conveyor 12 thereof.

The frame A as is customary has arranged at its outer end a wheel 43 which travels upon the ground in the advancement of the binder and such wheel may be vertically adjusted relative to said frame to have the latter at the proper or desired height from the ground surface and also the sickle thereon.

What is claimed is:

1. In an attachment for a grain binder, a broad cast header and a sickle at its lead edge comprising a pair of angle bars secured to the under side of the header in spaced parallel relation to each other and extended forwardly of the lead edge thereof, forwardly tapered substantially triangular shaped panels secured perpendicularly to said bars to effect a way therebetween, forwardly inclined endless gathering chains supported for operation in the way by said panels and having gathering spurs, rearwardly inclined extensions on said panels and overhanging the header, endless transfer chains arranged next to the gathering chains and held rearwardly inclined by said extensions and in overhanging relation to the header, and means operated by the binder for driving the gathering and transfer chains simultaneously with each other.

2. In an attachment for a grain binder, a broad cast header and a sickle at its lead edge comprising a pair of angle bars secured to the under side of the header in spaced parallel relation to each other and extended forwardly of the lead edge thereof, forwardly tapered substantially triangular shaped panels secured perpendicularly to said bars to effect a way therebetween, forwardly inclined endless gathering chains supported for operation in the way by said panels and having gathering spurs, rearwardly inclined extensions on said panels and overhanging the header, endless transfer chains arranged next to the gathering chains and held rearwardly inclined by said extensions and in overhanging relation to the header, a pair of power shafts arranged below the header and extending in the direction of the lead end thereof, and driven connections between said power shafts and the gathering and transfer chains for operation thereof.

3. In an attachment for a grain binder, a broad cast header and a sickle at its lead edge comprising a pair of angle bars secured to the under side of the header in spaced parallel relation to each other and extended forwardly of the lead edge thereof, forwardly tapered substantially triangular shaped panels secured perpendicularly to said bars to effect a way therebetween, forwardly inclined endless gathering chains supported for operation in the way by said panels and having gathering spurs, rearwardly inclined extensions on said panels and overhanging the header, endless transfer chains arranged next to the gathering chains and held rearwardly inclined by said extensions and in overhanging relation to the header, a pair of power shafts arranged below the header and extending in the direction of the lead end thereof, driven connections between said power shafts and the gathering and transfer chains for operation thereof, and guards arranged on said panels and overhanging the said chains.

HENRY HARNISCH.